F. W. WHELPLEY & F. A. BICKNELL.
REVERSING MECHANISM FOR TAPS, DRILLS, &c.
APPLICATION FILED OCT. 6, 1916.
1,277,011.
Patented Aug. 27, 1918.
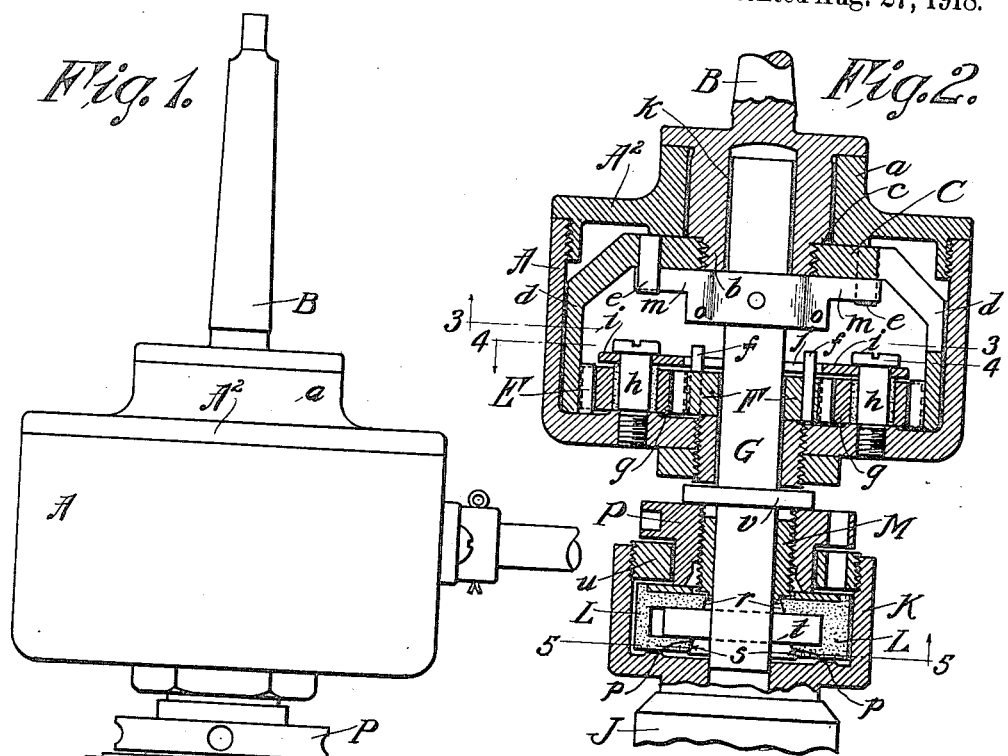
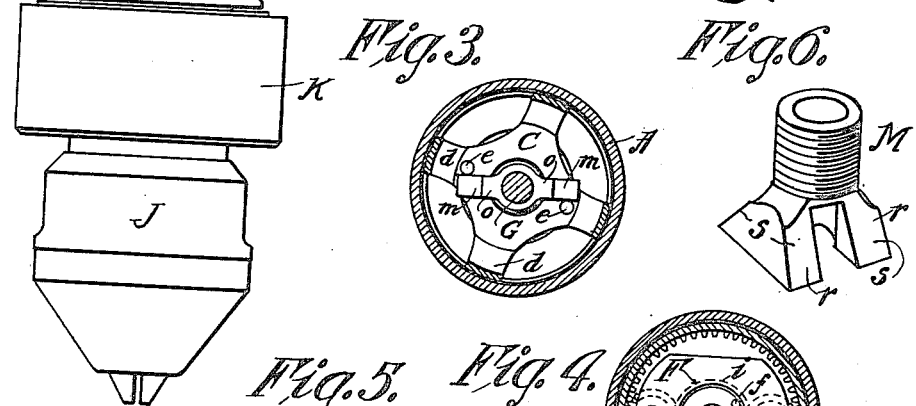
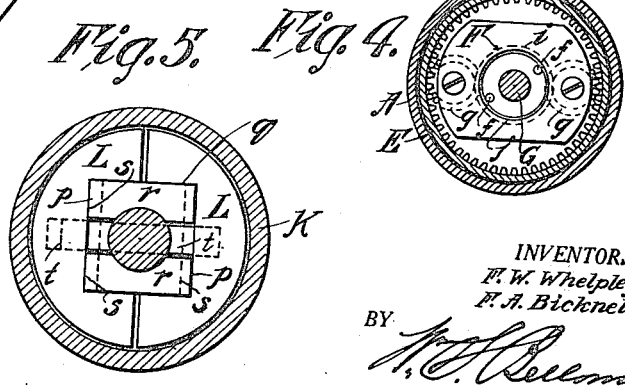
WITNESS:
B. A. Leaver
INVENTORS,
F. W. Whelpley and
F. A. Bicknell,
BY
ATTORNEY.

UNITED STATES PATENT OFFICE.

FREDERICK W. WHELPLEY AND FRANK A. BICKNELL, OF GREENFIELD, MASSACHUSETTS.

REVERSING MECHANISM FOR TAPS, DRILLS, &c.

1,277,011. Specification of Letters Patent. Patented Aug. 27, 1918.

Application filed October 6, 1916. Serial No. 124,057.

*To all whom it may concern:*

Be it known that we, FREDERICK W. WHELPLEY and FRANK A. BICKNELL, respectively a British subject and a citizen of the United States of America, and residents of Greenfield, in the county of Franklin and State of Massachusetts, have invented certain new and useful Improvements in Reversing Mechanism for Taps, Drills, &c., of which the following is a full, clear, and exact description.

This invention relates to improvements in a mechanism by which a tap is carried and which is operative for a direct driving of the tool for performing its screw threading action in a piece of work, and for causing during the running in the same direction of the driving spindle, by the operation of shiftable parts, the reversed rotation of the tap to cause thereby its being turned and raised out of engagement with the hole in which it had operated.

The invention is also well applicable for carrying and controlling the movements of a drill and some other machine tools.

The invention also relates to an improved form of friction clutch to be employed between the chuck or tool carrying element in the shaft or spindle which drives it so that in case the tap or drill encounters an obstruction or becomes stuck so as to resist a reasonable turning force therefor, the tool carrying portion of the clutch will slip relatively to the shaft which drives it for the avoidance of breakage or injury to the tool.

The invention is described in conjunction with the accompanying drawings and is set forth in the claims.

In the drawings:—

Figure 1 is a side elevation affording a representation of the external aspect with the reversing mechanism and the friction clutch interposed between such mechanism and the tool carrying chuck.

Fig. 2 is a vertical section on the plane of the axis of the improved mechanisms.

Fig. 3 is a horizontal cross section, on a smaller scale, on line 3—3, Fig. 2, looking upward.

Fig. 4 is a horizontal cross section on the smaller scale, as taken on line 4—4, Fig. 2, looking downward.

Fig. 5 is a horizontal section through the lower portion of the friction clutch as seen on line 5—5, in the direction of the arrow.

Fig. 6 is a perspective view of an element comprised in the friction clutch to be hereinafter more particularly referred to.

In the drawings, A represents a cylindrical casing provided with a top-closing screw-engaged annular cap or cover $A^2$ formed with an upwardly extended hub portion $a$, to afford appropriate bearings for the base portion of the driving spindle, "taper shank", or member B, which base portion is fitted closely but for free rotation in and through the cap of the casing and is provided just below the cap with an externally screw threaded portion $b$ of reduced diameter and whereby a shoulder $c$ is formed.

C represents a member affixed by a screw thread engagement to the screw threaded portion $b$ of the spindle B, the same being turned to a hard bind or set against the shoulder $c$ so that while the mechanism is in use, the parts B and C are as one.

The said member C has outwardly and downwardly extended portions $d$, which carry at their bottoms an internal gear wheel E, located to turn on or closely relatively to the base of the casing 4.

The aforementioned member C by which the internal gear wheel is revolubly carried, is provided with comparatively short opposite depending studs $e\ e$ at considerable distance outwardly beyond the axis of the device.

F represents a spur gear wheel which is freely revoluble in and at the base portion of the casing and centrally within the internal gear wheel E; and this gear wheel is provided with opposite upstanding studs $f\ f$.

$g\ g$ represent duplicated pinions rotatable about the journal studs $h\ h$ connected with the base of the casing, said pinions being between and in mesh with the internal gear and the central gear.

The centrally apertured plate $i$ held in place by the heads of the screw-engaged journal studs $h$ restrains the central gear wheel and the pinions from having any undue rising movement while the central circular aperture $j$ therein affords freedom for revolution of the upstanding studs $f\ f$ carried by such gear.

D represents a chuck or tool-carrying shaft extended centrally and loosely through the lower portion of the casing and through the central gear therein, having a guiding engagement for vertical movement in a downwardly opening socket $k$ in the lower portion of the spindle B.

This shaft, between the underside of the spindle-carried member C and the central gear wheel F has a horizontal centrally apertured bar pinned or otherwise rigidly affixed thereto, which bar forms by its opposite extremities, arms or engagement members $m\ m$ and $o\ o$ for coaction respectively with the depending studs $e\ e$ of the spindle-carried member C or the upstanding studs $f\ f$ of the central gear accordingly as the chuck carrying shaft section G is relatively elevated or depressed in and through the casing.

By making the extensions of the shaft-carried bar which forms the opposite arms of step shape, as shown in Fig. 2, engagements of the portions $m$ with the studs $e$ may be at a considerable distance from the axis of the chuck carrying shaft section for correspondingly great leverage or power exerting action, and the range of movement required to shift the arms to engagement with the gear carrying stud is necessarily but comparatively slight.

The casing A has a radially extended rigid bar H, as usual in mechanisms of the present character, for engagement against the pillar or any suitable fixed part of the drill press in conjunction with the device as employed, so that the casing or body A is prevented from partaking of any rotative movement.

The tool carrying shaft section G has the upward movement thereof limited by the transverse arm thereof striking against the under surface of the spindle carried member C and its relatively downward movement is limited by the portions $o$ of the arms contacting against the gear retaining plate $i$.

In the operation of tapping, the tap carried in the chuck J connected with the shaft section G, on its presentation to its work will cause relatively the short downward sliding movement of the casing to bring the parts to the relations shown in Fig. 2, in which the spindle carried member C through its stud, engaging the portions $m\ m$ of the arms, will cause the driving of the tool carrying shaft section in the working direction which is the same as the direction of rotation of the driving spindle B.

The tapping operation having been carried through upon imparting upward or reversed force or movement to the mechanism, the shaft section G and its arms become relatively lowered to bring the portions $o\ o$ of the (revolving) arms into engagement with the upstanding studs $f$ of the central gear, causing, through the action of the internal and intermediate pinion gears the reversed rotation of the shaft section B and the tap or other tool carried thereby.

The tool carrying chuck is connected to the rotatable shaft through means of a friction clutch to be described as follows:

The chuck has at its upper portion a fixed cup-shaped casing K, the shaft section being interlocked with said casing against relatively endwise movement.

Within the lower portion of the cup shaped casing are an opposite and separable pair of friction shoes or segments L L.

These friction shoes have inclined surfaces $p\ p$ in recesses $q$ formed within their adjacent or inner edges.

M represents an externally screw threaded sleeve-like part which encircles the shaft section and has downwardly extended bifurcated portions $r\ r$ provided with opposite inclined surfaces $s$ in engagement with the inclined surfaces of the segment shoes.

A ring nut P, constrained against axial movement, encircles and has a screw thread engagement with the said sleeve-like member M for raising and lowering said member and the portions $r$ having the inclines relatively to the friction shoes L.

A pin $t$ passed loosely transversely through the shaft section has its opposite extremities extended between the bifurcated members $r\ r$ and into engagement with the shoes so that the latter and the shaft section must revolve in unison.

The one extremity of the pin may have a driving fit in the hole or socket therefor in one of the shoes, while the other extremity of the pin has a loose or sliding fit in the socket therefor in the other shoe.

Between the shank of the ring nut P and the circular wall of the casing K, an annular closing plate $u$ is inserted, and the ring nut is held against axial movement between the closing plate $u$ and the collar or shoulder $v$ on the shaft.

By turning the ring nut in either direction the part M having the inclined portions $r\ r$ will be raised or lowered to increase or diminish the binding effect between the friction shoes L which are engaged with the shaft and the casing K which is unitary with the chuck; and, therefore, through the regulating action of the ring nut the frictional bind or tension by which the chuck is driven may be such as is required or desirable for insuring sufficiently forcible driving of the tool, and yet one not so great as to cause breakage or injury under unusual working conditions.

We claim:—

1. A tap reversing mechanism consisting of a casing having an end wall and a side wall, a drive shaft having its upper end disposed in said casing and its lower extending through said casing, a gear positioned on the bottom wall of said casing around but not connected to said shaft, gears journaled to said bottom wall and in engagement with the first gear, upstanding studs on said first gear, a cap threaded on the side wall of said casing and provided with a central hub, a shaft having a socketed enlargement on its lower end inclosed by said hub and having bearing against the upper end of said hub, an internal gear wheel in normal engagement with the second named gears, means connecting said inner gear to the socketed enlargement of said shaft and adapted to secure said enlargement to the cap, depending studs on said means, and a cross bar on said first named shaft adapted to alternately engage with the upstanding studs or the depending studs.

2. A tap reversing mechanism consisting of a casing having an end wall, and a side wall, a cap threaded on said side wall and having a central hub, a shaft having a socketed enlargement disposed in said hub and provided with a shoulder having a bearing against the upper end of the hub, a reversing element threaded on the inner end of the enlargement and against said hub, whereby said enlargement is secured to said cap and may rotate with said reversing element, reversing elements in normal engagement with the first named reversing element, and a shaft extending through the bottom wall of the casing and having its upper end disposed slidably in the socket of said enlargement and adapted to be interlocked with either said first named reversing element or said second named reversing elements.

Signed by us at Greenfield, Mass., in presence of two subscribing witnesses.

FREDERICK W. WHELPLEY.
FRANK A. BICKNELL.

Witnesses:
ALBERT B. ALLEN,
RALPH E. BALLOU.